US009499663B2

(12) United States Patent
Beckmann

(10) Patent No.: US 9,499,663 B2
(45) Date of Patent: Nov. 22, 2016

(54) METHOD FOR PRODUCING A POLYETHER ETHER KETONE

(71) Applicant: Perpetuum-Ebner GmbH & Co. KG, St. Georgen (DE)

(72) Inventor: Jens Beckmann, Bremen (DE)

(73) Assignee: Perpetuum-Ebner GmbH & Co. KG, St. Georgen (DE)

( * ) Notice: Subject to any disclaimer, the term of this patent is extended or adjusted under 35 U.S.C. 154(b) by 37 days.

(21) Appl. No.: 14/405,329

(22) PCT Filed: Jun. 6, 2013

(86) PCT No.: PCT/EP2013/061700
§ 371 (c)(1),
(2) Date: Dec. 3, 2014

(87) PCT Pub. No.: WO2013/182642
PCT Pub. Date: Dec. 12, 2013

(65) Prior Publication Data
US 2015/0133621 A1 May 14, 2015

(30) Foreign Application Priority Data

Jun. 6, 2012 (DE) .................. 10 2012 209 550

(51) Int. Cl.
C08G 65/40 (2006.01)
(52) U.S. Cl.
CPC ..... *C08G 65/4012* (2013.01); *C08G 2261/411* (2013.01)
(58) Field of Classification Search
CPC .............. C08G 65/4012; C08G 2261/411
See application file for complete search history.

(56) References Cited

U.S. PATENT DOCUMENTS 4,882,397 A 11/1989 Kelsey

FOREIGN PATENT DOCUMENTS

| EP | 0148633 A2 | 7/1985 |
| JP | 2008037825 A | 2/2008 |
| JP | 2008037827 A | 2/2008 |
| WO | 2013182642 A1 | 12/2013 |

OTHER PUBLICATIONS

Chen, C.-H., et al., "Alternating and Diblock Donor—Acceptor Conjugated Polymers Based on Diindeno 1,2-b:2',1'-d thiophene Structure: Synthesis, Characterization, and Photovoltaic Applications," Chem. Asian J., 2010, 5, 2483-2492.*
Johnson, R. N., et al., "Poly(aryl Ethers) by Nucleophilic Aromatic Substitution. I. Synthesis and Properties," J. Polymer Sci: Part A-1-1, 1967, 5, 2375-2398.*
Vakalopoulos et al.: "New copper-mediated O-arylations of phenols with arylstannanes", Tetrahedron Letters vol. 47, (Oct. 2006) pp. 8607-8610.

(Continued)

Primary Examiner — Liam J Heincer
Assistant Examiner — Nicholas Hill
(74) Attorney, Agent, or Firm — The Webb Law Firm

(57) ABSTRACT

A method for producing a polyether ether ketone is disclosed. The method includes the following steps: a) causing a disubstituted benzophenone of the general formula (I) to react with a benzene derivative of the general formula (II),

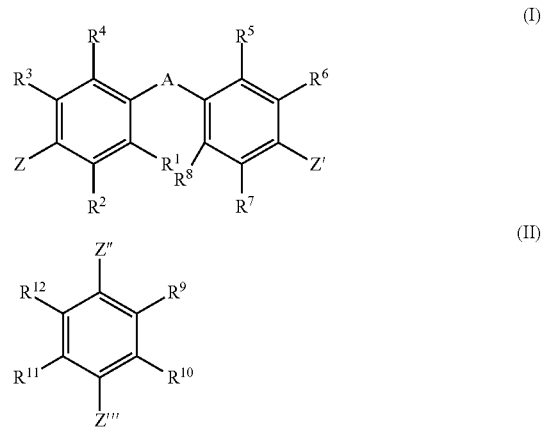

wherein A is a carbon atom provided with a protecting group; $R^1$, $R^2$, $R^3$, $R^4$, $R^5$, $R^6$, $R^7$, $R^8$, $R^9$, $R^{10}$, $R^{11}$, each independently of one another, are H, D, OH, X, substituted or unsubstituted $C_1$-$C_5$-alkyl or substituted or unsubstituted $C_6$-$C_{10}$-aryl; X is F, Cl, Br or I; Z, Z', Z'', Z''', each independently of one another, are OH, OMe, Me(OH)$_m$ MeR$^{13}{}_m$ or Me; m is 1, 2, 3 or 4; $R^{13}$ is metal, alkali metal or alkaline earth metal and Me is metal, alkali metal or alkaline earth metal. Subsequently, the product formed in step a) is deprotected in step b) in order to obtain a polyether ether ketone of the general formula (III):

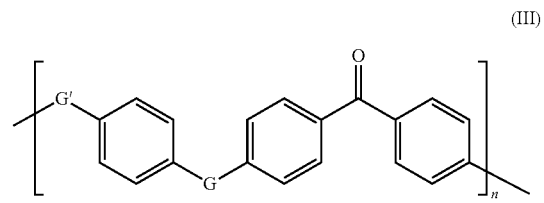

wherein G, G', each independently of one another, are O or C and n is an integer which is greater than 10.

11 Claims, No Drawings

(56) References Cited

OTHER PUBLICATIONS

Colquhoun et al.: "Reversible, Nondegradative Conversion of Crystalline Aromatic Poly(ether ketone)s into Organo-Soluble Poly(ether dithioketal)s", Macromolecules, vol. 42, (Mar. 2009), pp. 1955-1963.

Colquhoun et al.: "Dithioacetalisation of PEEK: a general technique for the solubilisation and characterisation of semi-crystalline aromatic polyketones", Chem. Commun., (Jul. 2007), pp. 3365-3367.

Evans et al.: "Synthesis of Diaryl Ethers through the Copper-Promoted Arylation of Phenols with Arylboronic Acids. An Expedient Synthesis of Thyroxine", Tetrahedron Letters vol. 39, (1998), pp. 2937-2940.

* cited by examiner

METHOD FOR PRODUCING A POLYETHER ETHER KETONE

CROSS-REFERENCE TO RELATED APPLICATIONS

This application is the United States national phase of International Application No. PCT/EP2013/061700 filed Jun. 6, 2013, and claims priority to German Patent Application No. 10 2012 209 550.0 filed Jun. 6, 2012, the disclosures of which are hereby incorporated in their entirety by reference.

BACKGROUND OF THE INVENTION

1. Field of the Invention

The invention relates in an aspect to a method for producing a polyether ether ketone.

2. Description of Related Art

Polyether ether ketone (PEEK) belongs to the group of the polyaryl ether ketones (PAEK). These high performance plastics are employed in ever increasing quantity in the areas of automobiles and rolling stock, aerospace, mechanical and apparatus engineering, electrical engineering and cables, electronics and semiconductors, medical technology as well as the food processing industry.

PEEK has the subsequently illustrated general structural formula (III):

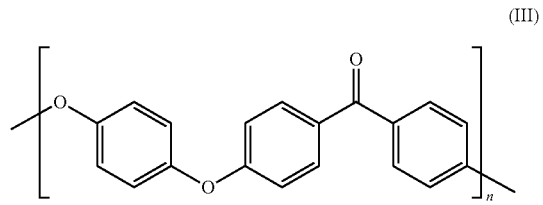

(III)

According to a method known from prior art the production of PEEK takes place by a Williamson ether synthesis based on 4,4'-difluorobenzophenone and hydroxyquinone which is first deprotonated with sodium carbonate. The polycondensation here typically takes place at 300° C. in the high-boiling solvent diphenyl sulfone (Ph$_2$SO$_2$). This reaction scheme is represented subsequently:

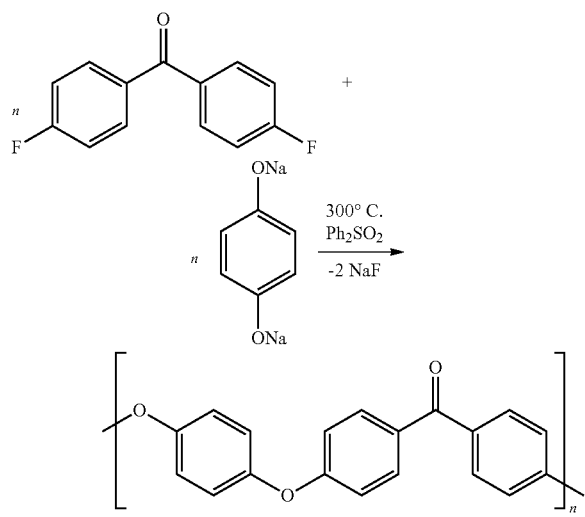

The high reaction temperature can be explained by the low solubility of PEEK in standard solvents at room temperature. The high reaction temperature, however, entails numerous drawbacks:

Due to the entropy effect the polymer yield and the molecular weight are lower than at lower temperatures.

At high temperatures uncontrollable side reactions occur. One problem here is that hydroxyquinone can easily be oxidized into quinone. Both compounds form a colored charge-transfer complex which negatively affects the color of the usually white PEEK.

Using the costly fluoride-containing starting product 4,4'-difluorobenzophenone as well as the likewise costly solvent diphenyl sulfone is imperative.

SUMMARY OF THE INVENTION

The object underlying an aspect of the present invention is to specify a method for producing a polyether ether ketone which overcomes the aforementioned drawbacks of the methods known from prior art.

This object is achieved by a method with the features explained in the following. This method is characterized by the following steps:

First, an at least disubstituted benzophenone of the general formula (I) is caused to react with a benzene derivative of the general formula (II).

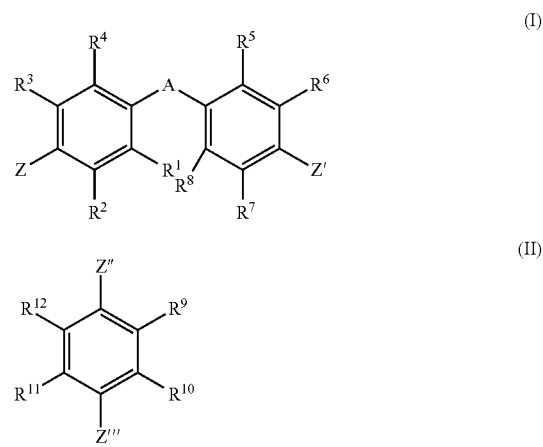

In these structural formulae:

A is a carbon atom provided with a protecting group, $R^1$, $R^2$, $R^3$, $R^4$, $R^5$, $R^6$, $R^7$, $R^8$, $R^9$, $R^{10}$, $R^{11}$, $R^{12}$, each independently of one another, are H, D, OH, X, substituted or unsubstituted $C_1$-$C_5$-alkyl or substituted or unsubstituted $C_6$-$C_{10}$-aryl, X is F, Cl, Br or I,

Z, Z', Z'', each independently of one another, are OH, OMe, Me(OH)$_m$ MeR$^{13}_m$ or Me, m is 1, 2, 3 or 4, $R^{13}$ is metal, alkali metal or alkaline earth metal and Me is metal, alkali metal or alkaline earth metal.

Thereafter, the product formed in the previous step is deprotected in order to obtain a polyether ether ketone of the general formula (III):

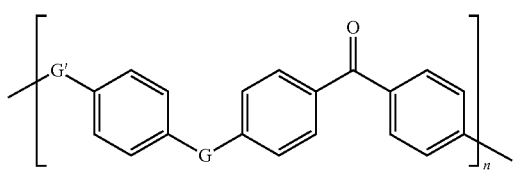

In this formula:
G, G', each independently of one another, are O or C and n is an integer which is greater than 10.

What is special about this method is that no 4,4'-difluorobenzophenone but instead a 4,4'-substituted benzophe-

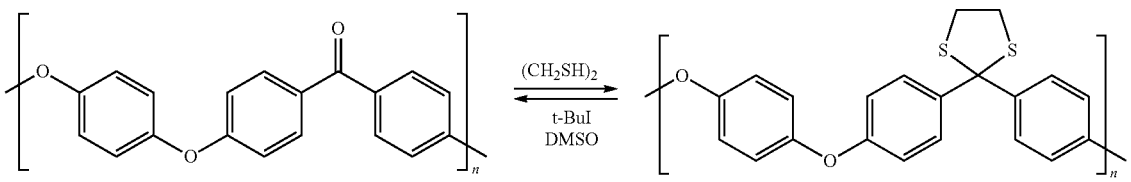

none provided with a protecting group is employed, which can optionally hold further substituents.

This method is suited both for producing classic PEEKs, in which the individual benzophenone and phenol units are linked by means of ether bridges, and for producing modified PEEKs, in which at least some of the benzophenone and phenol units are linked to each other via carbon atoms. The number of the carbon bridges introduced into the molecule can here be varied at will.

It is, however, especially suited to carry out the method in such a manner that the residues G and G' each are O, that is to say, that there are classic ether bridges.

Due to the high crystallinity and the high lattice energy accompanying it, PEEK is at room temperature practically insoluble in all the common organic solvents. It has a glass transition temperature ($T_g$) of 144° C. and a melting point ($T_m$) of 334° C. By introducing a protecting group, however, the PEEK shows completely different physical properties. It is now amorphous, accordingly, it has a lower lattice energy and is now soluble at room temperature in many organic solvents.

Thereby, the reaction temperature during the production process can be lowered significantly, as the protecting group now even at lower temperatures allows for a solubility of the formed product in common organic solvents.

In a variant, the method is hence carried out at a temperature of 250° C. or less, particularly 200° C. or less, particularly 150° C. or less, particularly 140° C. or less, particularly 130° C. or less, particularly 120° C. or less, particularly 110° C. or less, particularly 100° C. or less, particularly 90° C. or less, particularly 80° C. or less, particularly 70° C. or less, particularly 60° C. or less, particularly 50° C. or less, particularly 40° C. or less and very particularly 30° C. or less.

Suitable solvents are for instance trichloromethane (chloroform), dichloromethane or tetrahydrofuran (THF).

As a consequence of the lower reaction temperature or polymerization temperature less low-molecular products and byproducts are formed. Furthermore, it is no longer necessary to employ 4,4'-difluorobenzophenone as starting material. Rather, corresponding to the definition above a 4,4'-disubstituted benzophenone provided with a protecting group can also be used, which is available at a considerably lower cost.

The deprotecting of the formed PEEK can best take place by causing it to react in 2-iodo-2-methyl propane or tert-butyl iodide. A suitable solvent for this reaction is chloroform. Adding dimethyl sulfoxide (DMSO) is also suited.

In an embodiment, the protecting group is introduced into the 4,4'-dihalogenobenzophenone of the general formula (I) prior to step a) by causing a reaction of an 4,4'-dihalogenobenzophenone with a diol or a dithiol, in particular by causing a reaction with 1,2-ethanediol (glycol) or 1,2-ethanedithiol (thioglycol). Alkyl-substituted derivates of the aforementioned substances or of other diols or dithiols are likewise suitable for introducing a protecting group.

When 1,2-ethanediol is employed as reaction partner to introduce the protecting group a thioacetalized PEEK is formed according to the subsequent reaction scheme:

This reaction best takes place under strongly acidic conditions under which the carbonyl group to be protected is protonated. These strongly acidic conditions can for instance be adjusted by means of trifluoroacetic acid (TFA).

The thioacetalization is reversible and can be removed again, for instance by causing the protected product to react with tert-butyl iodide (t-bul) or 2-iodo-2-methyl propane. A suitable solvent for this deprotection reaction is dimethyl sulfoxide (DMSO).

The thioacetalized PEEK has a glass transition temperature of 157° C. and is soluble in trichloromethane and tetrahydrofuran among others.

Apart from a thioacetalization an acetalization has also turned out to be an especially suitable modification of the PEEK to introduce a protecting group. In an embodiment, the protecting group is hence a compound of the general formula (IV),

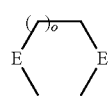

(IV)

wherein E is an oxygen atom or a sulfur atom, o is 1, 2, 3, 4, 5, 6, 7, 8, 9 or 10 and wherein the carbon atom to be protected is linked to the atoms of the type E by means of the two bonds illustrated in the formula (IV), as it is illustrated as an example in the subsequent general formula (V):

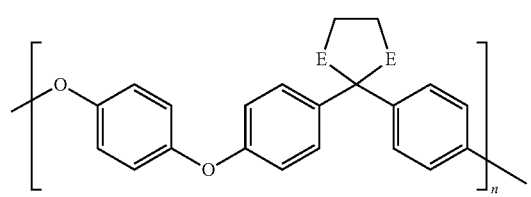

(V)

It is also possible that the protecting group contains both an oxygen atom and a sulfur atom, i.e. that group "E" has two different meanings in one molecule. Moreover, the protecting group can also consist of alkyl-substituted derivatives of the compounds of the general formula (IV).

In an embodiment, the residue Me is Li, Na, K, Ca, Bi, Sn or B. Aryl bismuth compounds or aryl tin compounds are especially suited here. It is likewise suited when Me is B, that is, when the benzene derivative is an aryl boron compound.

As at least disubstituted benzophenone preferably a compound having the following structural formula (VI) is employed in an embodiment:

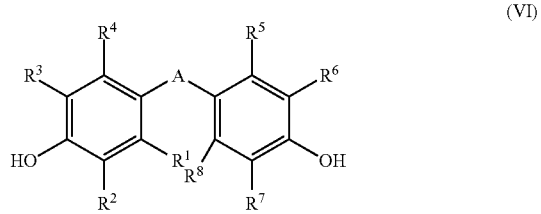
(VI)

That is to say, a 4,4'-dihydroxybenzophenone is employed as starting material in an embodiment. In this manner, the specified method can be carried out especially simply and cost-effectively.

In a further variant, a phenyl boric acid having the following structural formula (VII) is employed as benzene derivative:

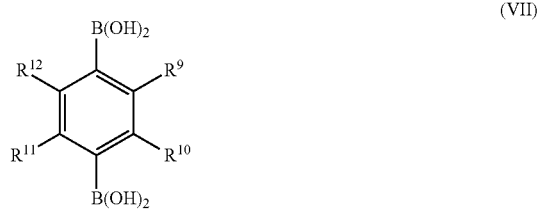
(VII)

It has thus become apparent that a 4,4'-substituted benzophenone can be caused to react especially well with such a phenyl boric acid and with a good yield.

Especially suited is the use of a 4,4'-dihydroxybenzophenone according to formula (VI) and of a phenyl boric acid according to formula (VII).

In a variant the caused reaction takes place in the presence of a catalyst to reduce the reaction times.

This catalyst is best selected from compounds which contain nickel, copper, zinc, palladium, silver, cadmium, platinum and/or gold. Further suitable catalysts are the aforementioned metals themselves.

Here copper oxide ($Cu_2O$), copper(II) triflate, copper nitrate ($Cu(NO_3)_2$), copper(II) acetate and/or copper(II) acetylacetonate (($Cu(acac)_2$) have turned out to be especially well suited as catalysts or parts of catalysts.

Moreover, it has become apparent that in particular alkali metal salts and/or alkaline earth metal salts are employed as (further) catalysts. In particular, employing sodium carbonate has turned out to be particular suited.

In a variant the product formed in step a) is first purified before a deprotection according to step b) takes place. Alternatively, also first a deprotection and then a purification of the product can take place.

DETAILED DESCRIPTION OF THE INVENTION

Further details of aspects of the present invention shall be further explained with the help of exemplary embodiments.

Example 1

Synthesis of 4,4'-(1,3-dithiolane-2,2-diyl)diphenol (2)

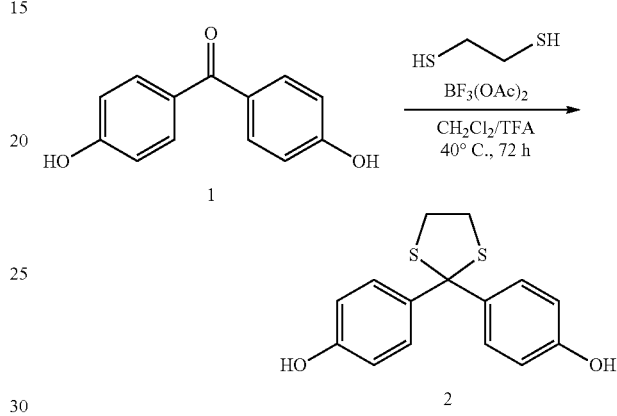

Under inert conditions ethanedithiol (14 mmol, 1.3 g) was added in drops to 4,4'-dihydroxybenzophenone (1) (7 mmol, 1.5 g) in dichloromethane (20 ml). After the mixture was cooled down to 0° C., boron trifluoride etherate (9.3 mmol, 1.3 g) and 2 ml trifluoroacetic acid were added in drops. The orange-colored solution was stirred for 72 hours at 40° C. The reaction mixture was rinsed with a 5% sodium hydrogen carbonate solution and water. After drying the organic phase with magnesium sulfate and removing the solvent in the vacuum the raw product 4,4'-(1,3-dithiolane-2,2-diyl)diphenol (2) was obtained.

Yield: 98

$^1$H-NMR (200 MHz, acetone-$d_6$) δ=3.43 (s, 4H, $CH_2$), 6.75 (m, 4H, H—Ar), 7.40 (m, 4H, H—Ar), 8.40 (s, 2H, OH) ppm $^{13}$C-NMR (90 MHz, acetone-$d_6$) δ=39.9, 77.1, 114.7, 130.0, 135.9, 156.8 ppm MS (EI, 70 eV) m/z=290 g/mol Melting point: 191-195° C.

Example 2

Synthesis of poly(ether-dithioacetal) (4)

The product gained in example 1 was thereafter used to produce a PEEK. This is represented in the subsequent reaction scheme:

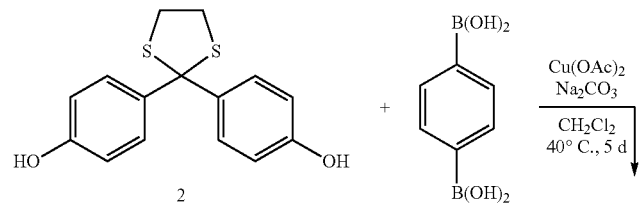

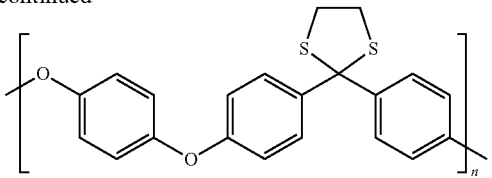

4

In a flask with a reflux condenser 200 mg (0.69 mmol) 4,4'-(1,3-dithiolane-2,2-diyl)diphenol (2) of example 1 were provided under inert conditions in 4 ml dichloromethane. 110 mg (0.8 mmol) sodium carbonate were added and the mixture was heated to 40° C. 251 mg (6.9 mmol) copper (II) acetate were added to this. Over the course of five days 1,4-phenylene diboric acid (115 mg; 0.69 mmol) was now added in small portions. The reaction mixture was cooled down to room temperature, filtered and the precipitate was re-rinsed with 5 ml dichloromethane. The solvent was removed under reduced pressure.

Poly(ether-dithioacetal) (4)

$^1$H-NMR (200 MHz, CDCl$_3$) δ=3.43 (s, 4H, CH$_2$), 6.90 (m, 4H, H—Ar), 7.58 (m, 4H, H—Ar) ppm $^{13}$C-NMR (90 MHz, CDCl$_3$) δ=40.8, 77.5, 117.7, 121.2, 130.5, 139.4, 152.9, 157.4 ppm The product was thereafter deprotected by means of 2-iodo-2-methyl propane in chloroform and DMSO while refluxing in order to obtain a PEEK without a protecting group.

The invention claimed is:

1. A method for producing a polyether ether ketone, comprising the following steps:
    a) causing an at least disubstituted benzophenone of the general formula (I) to react with a phenyl boric acid having the following structural formula (VII):

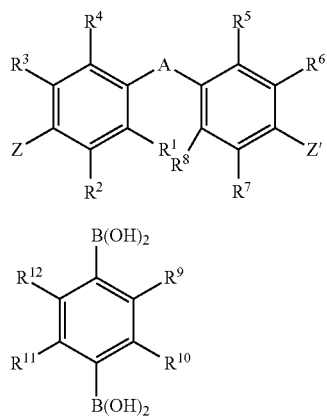

wherein
A is a carbon atom provided with a protecting group,
R$^1$, R$^2$, R$^3$, R$^4$, R$^5$, R$^6$, R$^7$, R$^8$, R$^9$, R$^{10}$, R$^{11}$, R$^{12}$, each independently of one another, are H, D, OH, X, substituted or unsubstituted C$_1$-C$_5$-alkyl or substituted or unsubstituted C$_6$-C$_{10}$-aryl,
X is F, Cl, Br or I,
Z, Z', Z", Z''', each independently of one another, are OH, OMe, Me(OH)$_m$ MeR$^{13}$$_m$ or Me,
m is 1, 2, 3 or 4,
R$^{13}$ is metal, alkali metal or alkaline earth metal and
Me is metal, alkali metal or alkaline earth metal, b) deprotecting the product formed in step a) in order to obtain a polyether ether ketone of general formula (III):

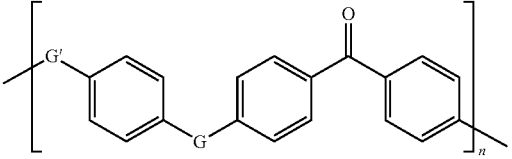

wherein
G, G', each independently of one another, are O or C and n is an integer which is greater than 10.

2. The method according to claim 1, further comprising a step preceding step a) in which the protecting group is introduced into the disubstituted benzophenone of the general formula (I) by causing a reaction of a disubstituted benzophenone with a diol or a dithiol.

3. The method according to claim 2, wherein the diol is 1,2-ethanediol.

4. The method according to claim 2, wherein the dithiol is 1,2-ethanedithiol.

5. The method according to claim 1, wherein the protecting group is a compound of the general formula (IV) or a alkyl-substituted derivative thereof,

wherein
E is O or S and
o is 1, 2, 3, 4, 5, 6, 7, 8, 9 or 10
and wherein the carbon atom to be protected is linked to the atoms of the type E by means of the two bonds illustrated in the formula (IV).

6. The method according to claim 1, wherein Me is Li, Na, K, Ca, Bi, Sn or B.

7. The method according to claim 1, wherein as at least disubstituted benzophenone a compound having the following structural formula (VI) is employed:

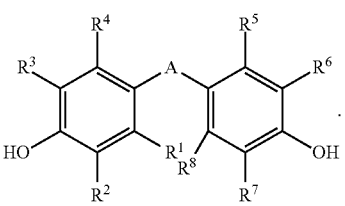

8. The method according to claim 1, wherein the product formed in step a) is first purified before a deprotection according to step b) takes place.

9. A method for producing a polyether ether ketone, comprising the following steps:

a) causing an at least disubstituted benzophenone of the general formula (I) to react with a benzene derivative of general formula (II) in the presence of a catalyst, wherein the catalyst is selected from compounds which contain nickel, copper, zinc, palladium, silver, cadmium, platinum and/or gold, and from the aforementioned metals themselves,

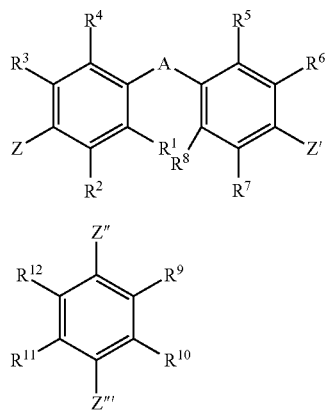

wherein

A is a carbon atom provided with a protecting group, $R^1$, $R^2$, $R^3$, $R^4$, $R^5$, $R^6$, $R^7$, $R^8$, $R^9$, $R^{10}$, $R^{11}$, $R^{12}$, each independently of one another, are H, D, OH, X, substituted or unsubstituted $C_1$-$C_5$-alkyl or substituted or unsubstituted $C_6$-$C_{10}$-aryl, X is F, Cl, Br or I, Z, Z', Z'', Z''', each independently of one another, are OH, OMe, Me(OH)$_m$ MeR$^{13}{}_m$ or Me, m is 1, 2, 3 or 4, $R^{13}$ is metal, alkali metal or alkaline earth metal and Me is metal, alkali metal or alkaline earth metal, b) deprotecting the product formed in step a) in order to obtain a polyether ether ketone of general formula (III):

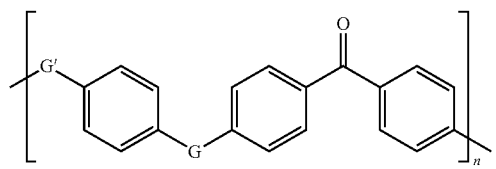

wherein

G, G', each independently of one another, are 0 or C and n is an integer which is greater than 10.

10. The method according to claim 9, wherein the catalyst contains copper oxide, copper(II) triflate, copper nitrate, copper(II) acetate and/or copper (II) acetylacetonate.

11. The method according to claim 9, wherein the product formed in step a) is first purified before a deprotection according to step b) takes place.

* * * * *